(12) United States Patent
Le Duff (10) Patent No.: US 12,431,149 B2
(45) Date of Patent: Sep. 30, 2025

(54) COMPRESSIVE SENSING FOR FULL MATRIX CAPTURE (71) Applicant: Evident Canada, Inc., Québec (CA)

(72) Inventor: Alain Le Duff, Quebec (CA)

(73) Assignee: Evident Canada, Inc., Québec (CA)

( * ) Notice: Subject to any disclaimer, the term of this patent is extended or adjusted under 35 U.S.C. 154(b) by 215 days.

(21) Appl. No.: 17/906,316

(22) PCT Filed: Mar. 17, 2021

(86) PCT No.: PCT/CA2021/050354
§ 371 (c)(1),
(2) Date: Sep. 14, 2022

(87) PCT Pub. No.: WO2021/189130
PCT Pub. Date: Sep. 30, 2021

(65) Prior Publication Data
US 2023/0098406 A1 Mar. 30, 2023

Related U.S. Application Data

(60) Provisional application No. 62/993,849, filed on Mar. 24, 2020.

(51) Int. Cl.
*G10L 19/022* (2013.01)
(52) U.S. Cl.
CPC ................... *G10L 19/022* (2013.01)
(58) Field of Classification Search
CPC ............ G10L 19/022; G01N 2291/106; G01N 29/043; G01N 29/0654; G01N 29/2437;
(Continued)

(56) References Cited

U.S. PATENT DOCUMENTS 8,861,588 B2 * 10/2014 Nguyen .............. G01S 13/9017
375/240
10,712,416 B1 * 7/2020 Sandino ................. G06N 3/045
(Continued)

FOREIGN PATENT DOCUMENTS

CN        1589410 A     3/2005
CN    102727259 A    10/2012
(Continued)

OTHER PUBLICATIONS

"Japanese Application Serial No. 2022-557932, Response filed Oct. 12, 2023 to Notification of Reasons for Refusal mailed Jul. 18, 2023", w Current English Claims, 7 pgs.
(Continued)

*Primary Examiner* — ThuyKhanh Le
(74) *Attorney, Agent, or Firm* — Schwegman Lundberg & Woessner, P.A.

(57) ABSTRACT

Examples of the present subject matter provide techniques for compressive sampling of acoustic data. A probe may sample in a compression mode, such that the entire matrix is not sampled at full-time resolution or spatial resolution. Therefore, the initial amount of data captured by the probe is reduced, allowing for lower density hardware (e.g., fewer analog-to-digital conversion channels or related analog front-end hardware) to be used at a lower data rate.

12 Claims, 11 Drawing Sheets

(58) Field of Classification Search
CPC .. G01N 29/262; G01N 29/28; G01N 29/4472; G01N 29/44; G01S 7/52034; G01S 7/52046; G01S 15/8915; G01S 7/52025
USPC .......................................................... 704/500
See application file for complete search history.

(56) References Cited

U.S. PATENT DOCUMENTS

| | | | | |
|---|---|---|---|---|
| 11,175,627 | B2* | 11/2021 | Haeffele | G03H 1/0866 |
| 11,525,906 | B2* | 12/2022 | Kadambi | G06T 7/593 |
| 2002/0158632 | A1* | 10/2002 | Sodickson | G01R 33/5611 324/309 |
| 2009/0285463 | A1 | 11/2009 | Otazo et al. | |
| 2011/0123192 | A1* | 5/2011 | Rosenthal | H03M 1/121 398/43 |
| 2011/0241675 | A1* | 10/2011 | Constable | G01R 33/4824 324/309 |
| 2012/0250748 | A1* | 10/2012 | Nguyen | G01S 13/9017 375/316 |
| 2014/0035576 | A1* | 2/2014 | Li | G01R 33/5619 324/309 |
| 2014/0218026 | A1* | 8/2014 | Moeller | G01R 33/4835 324/309 |
| 2015/0287223 | A1* | 10/2015 | Bresler | G06T 11/006 382/131 |
| 2015/0346305 | A1* | 12/2015 | King | G01R 33/5611 324/309 |
| 2016/0018499 | A1* | 1/2016 | Bornert | G01R 33/36 324/309 |
| 2016/0232690 | A1* | 8/2016 | Ahmad | G01R 33/48 |
| 2017/0003368 | A1* | 1/2017 | Rathi | G01R 33/56341 |
| 2017/0035319 | A1* | 2/2017 | Zhao | A61B 5/0263 |
| 2017/0169563 | A1* | 6/2017 | Liang | A61B 5/0044 |
| 2017/0281013 | A1* | 10/2017 | Natarajan | A61B 5/002 |
| 2018/0198992 | A1* | 7/2018 | Kang | G06T 5/50 |
| 2019/0213761 | A1* | 7/2019 | Rosen | G06N 3/045 |
| 2019/0336107 | A1 | 11/2019 | Hope Simpson et al. | |
| 2020/0333416 | A1* | 10/2020 | Moeller | G01R 33/5608 |
| 2020/0400802 | A1* | 12/2020 | Zhang | G01S 7/52028 |
| 2020/0405269 | A1* | 12/2020 | Swisher | G06N 3/08 |
| 2021/0055337 | A1* | 2/2021 | Kim | G06N 3/044 |
| 2022/0058347 | A1* | 2/2022 | Singaraju | H04L 51/02 |
| 2022/0075017 | A1* | 3/2022 | Sabuncu | G01R 33/561 |
| 2022/0171947 | A1* | 6/2022 | Xu | G06F 40/35 |
| 2022/0308147 | A1* | 9/2022 | Chen | G06V 10/82 |
| 2022/0366893 | A1* | 11/2022 | Qu | G10L 15/063 |
| 2023/0021358 | A1* | 1/2023 | Cao | G06T 7/74 |
| 2023/0377314 | A1* | 11/2023 | Pezzotti | G06V 10/774 |
| 2024/0175952 | A1* | 5/2024 | Ding | G01R 33/5614 |

FOREIGN PATENT DOCUMENTS

| | | |
|---|---|---|
| CN | 102928510 A | 2/2013 |
| CN | 107110959 A | 8/2017 |
| CN | 108345904 A | 7/2018 |
| CN | 110742647 A | 2/2020 |
| CN | 115362367 | 11/2022 |
| JP | 7475478 | 4/2024 |
| WO | 2019162485 | 8/2019 |
| WO | WO-2019166332 A1 | 9/2019 |
| WO | WO-2021189130 A1 | 9/2021 |

OTHER PUBLICATIONS

"Japanese Application Serial No. 2022-557932, Notification of Reasons for Refusal mailed Nov. 20, 2023", w English Translation, 9 pgs.
"Canadian Application Serial No. 3,175,711, Examiners Rule 86(2) Report mailed Dec. 1, 2023", 4 pgs.
"European Application Serial No. 21776104.8, Response filed Apr. 18, 2023 to Communication pursuant to Rules 161(2) and 162 EP", 3 pgs.
"Japanese Application Serial No. 2022-557932, Notification of Reasons for Refusal mailed Jul. 18, 2023", w English Translation, 13 pgs.
"International Application Serial No. PCT/CA2021/050354, International Search Report mailed Jun. 17, 2021", 3 pgs.
"International Application Serial No. PCT/CA2021/050354, Written Opinion mailed Jun. 17, 2021", 4 pgs.
"Japanese Application Serial No. 2022-557932, Response filed Feb. 19, 2024 to Notification of Reasons for Refusal mailed Nov. 20, 2023", w English Claims, 6 pgs.
"European Application Serial No. 21776104.8, Extended European Search Report mailed Mar. 13, 2024", 8 pgs.
"Canadian Application Serial No. 3,175,711, Response filed Mar. 27, 2024 to Examiners Rule 86(2) Report mailed Dec. 1, 2023", 23 pgs.
Greenhalgh, Stewart A, "Solutions, algorithms and inter-relations for local minimization search geophysical inversion; Solutions for geophysical inversion", Journal of Geophysics and Engineering, Institute of Physics Publishing, Bristol, GB, vol. 3, No. 2, (Jun. 1, 2006), 101-113.
Zhou, Bing, "Iterative Algorithm For the Damped Minimum Norm, Least-squares and Constrained Problem in Seismic Tomography", Exploration Geophysics, vol. 23, No. 3, (Aug. 31, 2015), 497-505.
"European Application Serial No. 21776104.8, Response filed Oct. 2, 2024 to Extended European Search Report mailed Mar. 13, 2024", w/ claims, 7 pgs.
"Chinese Application Serial No. 202180023382.8, Office Action mailed Apr. 1, 2025", w/ English translation, 22 pgs.

* cited by examiner

COMPRESSIVE SENSING FOR FULL MATRIX CAPTURE

CLAIM OF PRIORITY

This patent application is a U.S. National Stage filing under 35 U.S.C. § 371 from International Application No. PCT/CA2021/050354, titled "COMPRESSIVE SENSING FOR FULL MATRIX CAPTURE", filed on Mar. 17, 2021, which claims the benefit of priority to U.S. Provisional Patent Application Ser. No. 62/993,849, titled "COMPRESSIVE SENSING FOR FULL MATRIX CAPTURE," filed on Mar. 24, 2020, which are hereby incorporated by reference herein in their entireties.

TECHNICAL FIELD

The present disclosure generally relates to non-destructive sensing techniques, in particular compressive sensing.

BACKGROUND

Non-destructive inspection probes, such as ultrasonic sensors, typically include a matrix of sensing elements, such as acoustic transducers, which generate acoustic data. The matrix of sensing elements can provide electrical signals that when digitized generate a large amount of data, particularly when the full matrix of sensing elements is used for data capture. And the size of the data increases as the count of sensing elements increases.

One technique to reduce the size of data has been to apply data compression to the acoustic data. Here, the full matrix of sensing elements is sampled to provide time-series representations of the signals received at each transducer in the matrix, and the sampled data is then compressed using a digital compression technique. The compressed data can then be transmitted to a post-acquisition application. This approach, however, still suffers from serious drawbacks. For example, this approach generally involves using high density hardware and a high data rate to sample the full matrix and pre-process the data before the data compression. Thus, as the count of sensing elements increase, the hardware size and complexity are expected to also increase.

BRIEF DESCRIPTION OF THE DRAWINGS

Various ones of the appended drawings merely illustrate example implementations of the present disclosure and should not be considered as limiting its scope.

DETAILED DESCRIPTION

Accordingly, the present inventor has recognized, among other things, that this challenge of handling large amount of data can be addressed by using compressive sensing, as described herein. Techniques for compressive sensing as described herein can be performed without significantly increasing hardware size or complexity.

This document describes a method comprising: obtaining signals representative of one or more acoustic waves received using a matrix of sensing elements, wherein N samples define a full matrix representation of the signals; under sampling the obtained signals by a subset M samples, wherein N is greater than M; and reconstructing an image from the M samples.

This document also describes a machine-storage medium embodying instructions that, when executed by a machine, cause the machine to perform operations comprising: obtaining signals representative of one or more acoustic waves received using a matrix of sensing elements, wherein N samples define a full matrix representation of the signals; under sampling the obtained signals by a subset M samples, wherein N is greater than M; and reconstructing an image from the M samples.

This document further describes a system with one or more processors of a machine. The system also includes a memory storing instructions that, when executed by the one or more processors, cause the machine to perform operations comprising: obtaining signals representative of one or more acoustic waves received using a matrix of sensing elements, wherein N samples define a full matrix representation of the signals; under sampling the obtained signals by a subset M samples, wherein N is greater than M; and reconstructing an image from the M samples.

Figure 1:
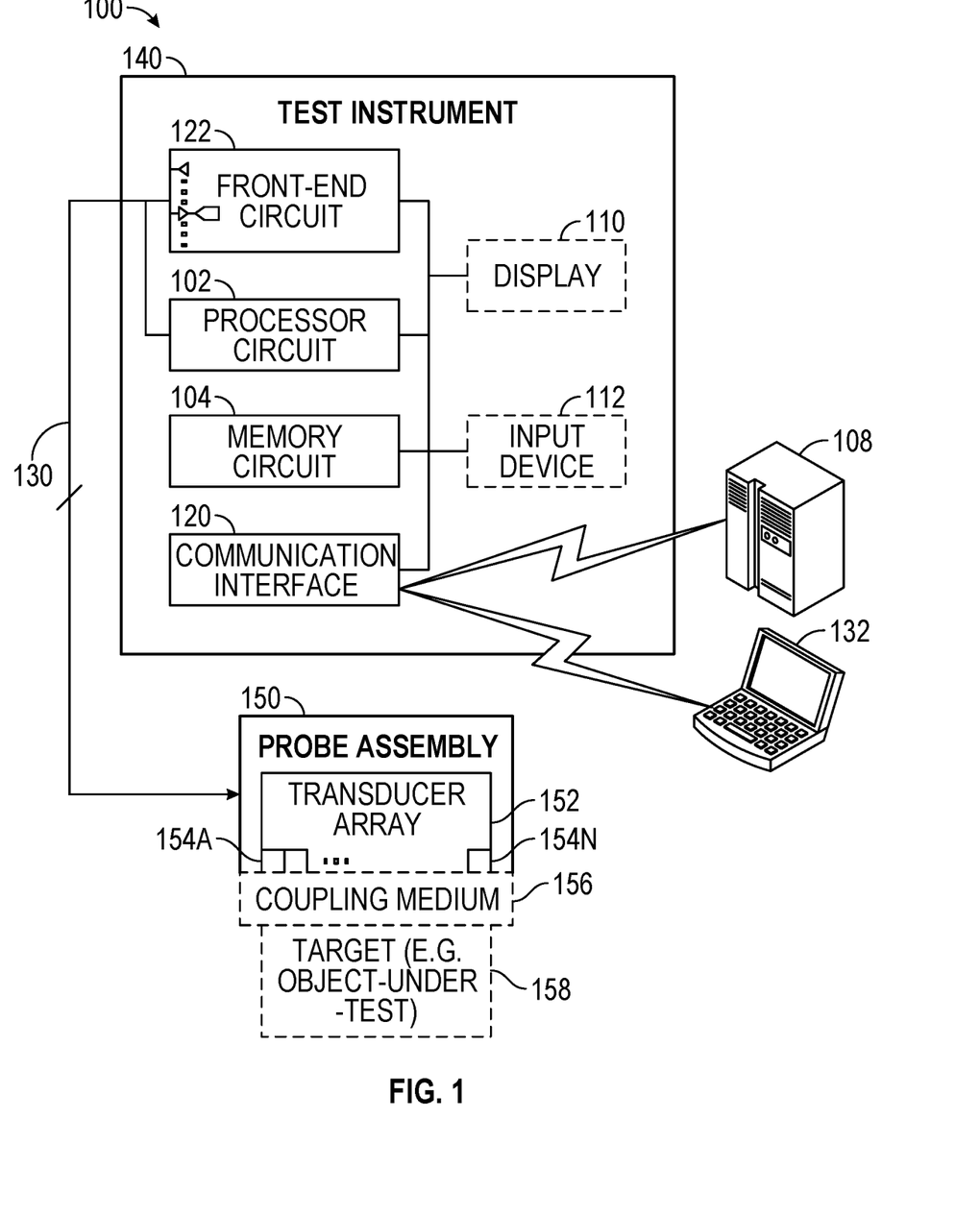
FIG. 1 illustrates an inspection system, according to an example of the present subject matter.

FIG. 1 illustrates generally an example comprising an acoustic inspection system 100, such as can be used to perform one or more techniques showed and described elsewhere herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with different probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figure 2:
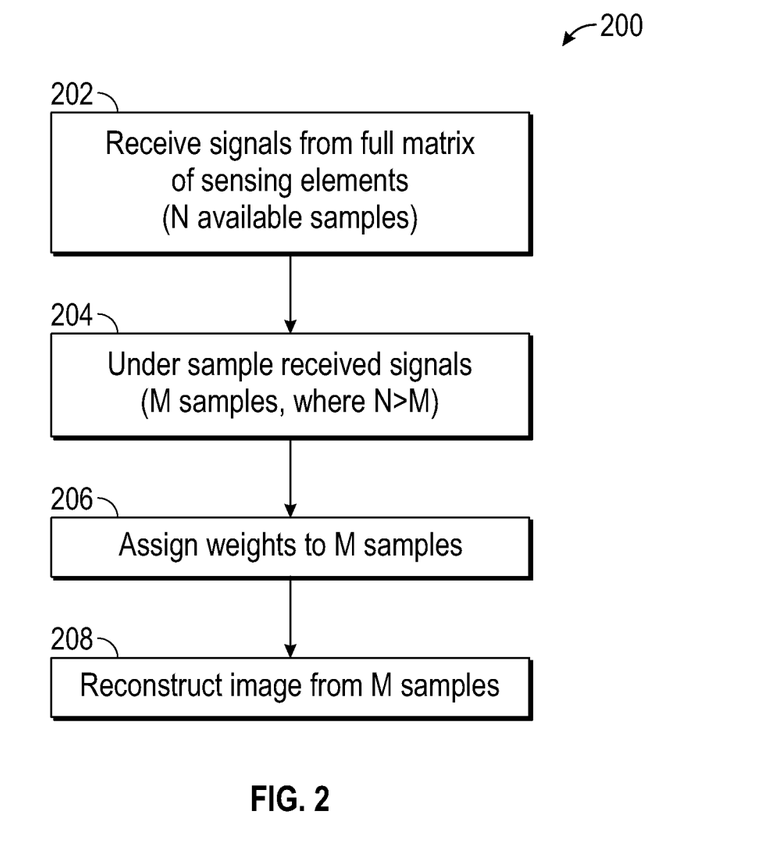
FIG. 2 is a flow diagram of a process for compressive sampling, according to an example of the subject matter.

Next, techniques for compressive sensing will be described. FIG. 2 is a flow diagram of a process 200 for compressive sampling, according to an example of the subject matter. At 202, signals from a full matrix of sensing elements (e.g., transducer components) of a probe may be received. The signals may be in response to acoustic signals transmitted by the probe into an object and may represent echo signals from the object. The received signals may provide N available samples. At 204, compressive sampling may be performed and a subset M of the N available samples may be taken, where N is greater than M (N>M); hence, not all samples will be obtained per the compressive sampling techniques described herein. This may be referred to as under sampling. The M samples may be randomly selected from N available samples.

The probe may sample in a compression mode, such that the entire matrix of sensing elements may not be sampled at the full time or spatial resolution. For example, the probe may obtain samples at a specified time resolution, up to full time resolution, but providing a lower mean sampling rate. Therefore, the initial amount of data captured by the probe is reduced, allowing for lower density hardware (e.g., fewer analog-to-digital conversion channels or related analog front-end hardware) to be used at a lower data rate.

At 206, weights may be assigned to the M samples. The weights may be assigned randomly. The compressed sampled data (e.g., the weighted M samples) may be stored and/or transmitted for post-acquisition processing. For example, the compressed sampled data may be transmitted to a post-acquisition application. At 208, the compressed sample data may be decoded to reconstruct an image in a manner similar to a full-matrix image, but using the compressed sampled data, as described in further detail below.

Figure 3:
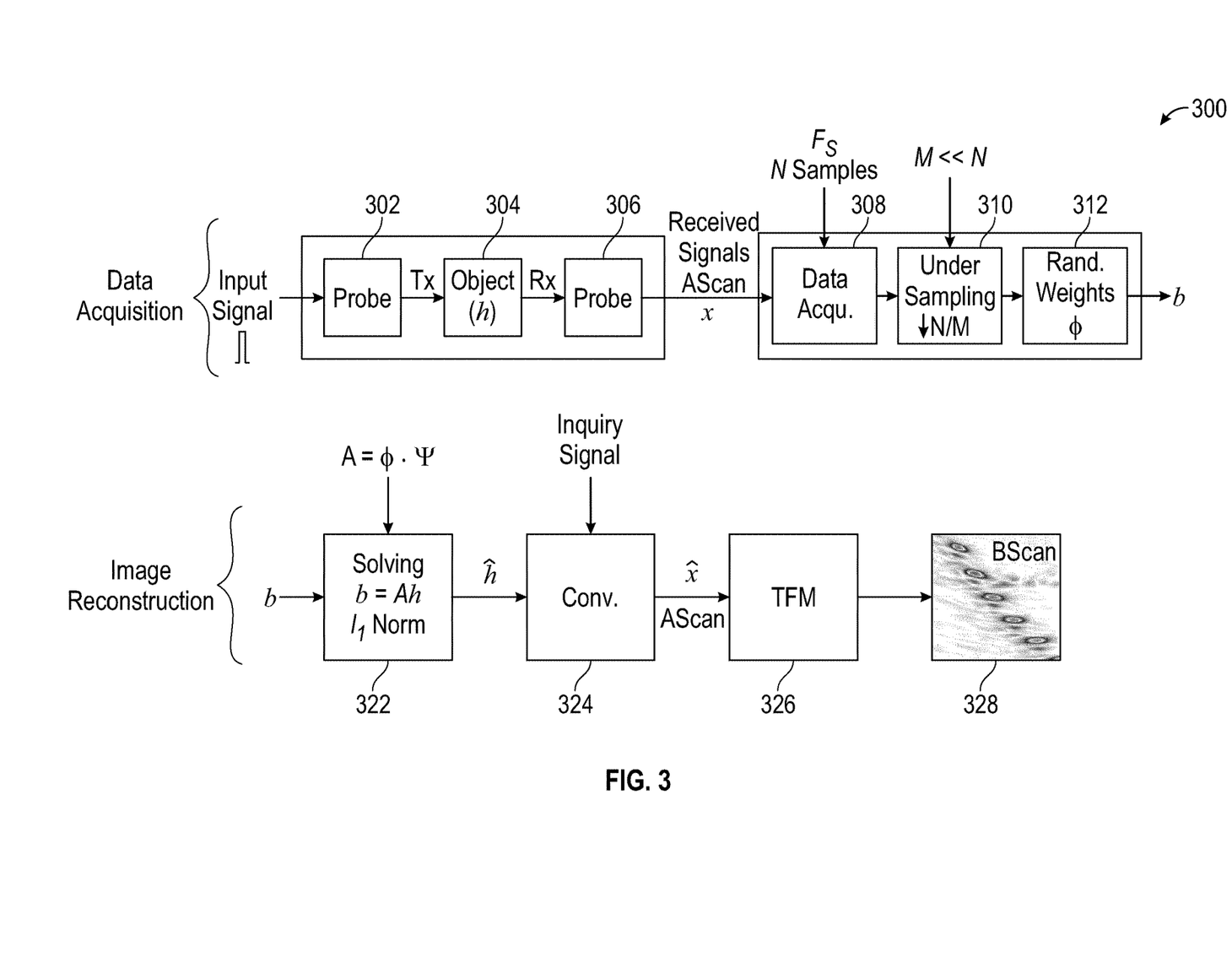
FIG. 3 is a graphical representation of a process for compressive sampling and image reconstructing, according to an example of the subject matter.

FIG. 3 is a graphical representation of a process 300 for compressive sampling and image reconstructing, according to an example of the subject matter. The process 300 may be organized into two stages: 1) Data acquisition and 2) Image reconstruction. Data acquisition may be performed by an acoustic inspection system, for example as described above with reference to FIG. 1. At 302, in response to an input signal (e.g., a pulse signal) from a drive circuit, a probe may generate and transmit one or more ultrasonic signals into an object. The probe may include a matrix of a sensing elements, which transform the input signal into an acoustic wave in transmission mode. At 304, the acoustic wave may propagate in the object and may reflect off structures (e.g., flaws) in the object. The variable h may represent a theoretical impulse response (IR) of the object. At 306, the reflected or received signals may be captured by the matrix of sensing elements.

At 308, data may be acquired from the received signals. For example, the acquired data may be provided as an A-scan, which refers to a time series of magnitude measurements versus time. Fs may refer to a sampling frequency and there may be N available samples in the acquired data. At 310, the acquired data may be under sampled so that a subset M of the N available samples are sampled. The M samples may be randomly selected. The count of available samples available (N) is greater than the count of retained samples (M). At 312, the compressed samples may then be assigned randomized weights (e.g., compression matrix φ) to generate an observation matrix b. The observation matrix b may be stored for later reconstruction.

Image reconstruction may begin with obtaining the observation matrix b generated in the data acquisition state. The full image may then be reconstructed from the observation matrix b and a model (e.g., inquiry signal, $\psi$); the reconstruction is described below in further detail. At 322, h, which is a reconstructed IR of the object, may be determined. A measurement matrix, A, may be calculated:

$$A = \phi \cdot \psi,$$

where $\psi$ represents a model matrix and $\phi$ represents the compression matrix $\phi$. Then, h may be determined according to the expression:

$$b = A \cdot h,$$

where $I_1$ is normalized. h may be converted to reconstructed data (A-scan). At 324, the reconstructed data (A-scan) may then be used for post-acquisition applications. In this example, at 326 total focusing method (TFM) may be employed to generate a final image (e.g., a B-scan) at 328; however, other imaging techniques may be used.

Figure 4:
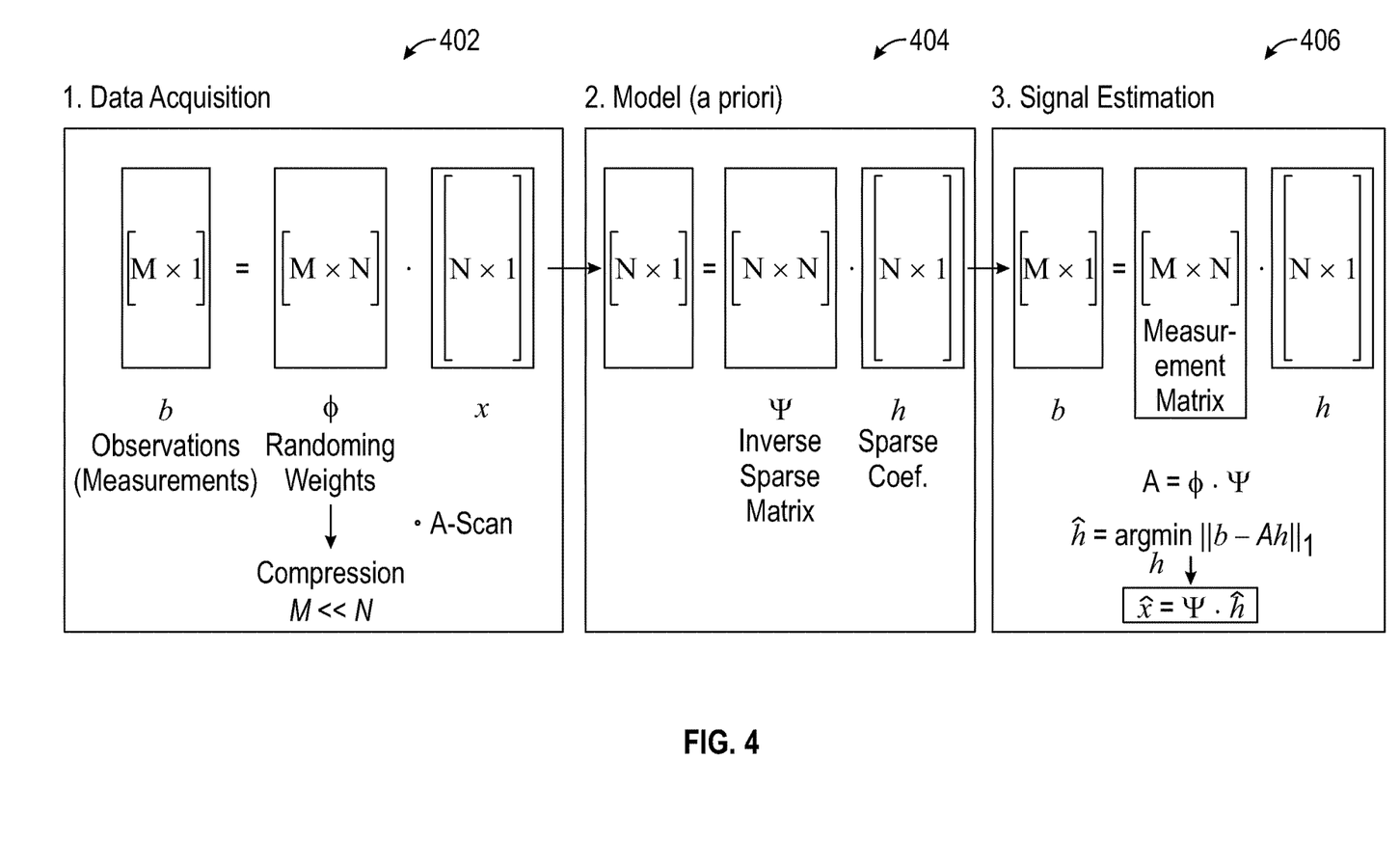
FIG. 4 is mathematical representation of compressive sampling and decoding, according to an example of the subject matter.
Figure 5A:
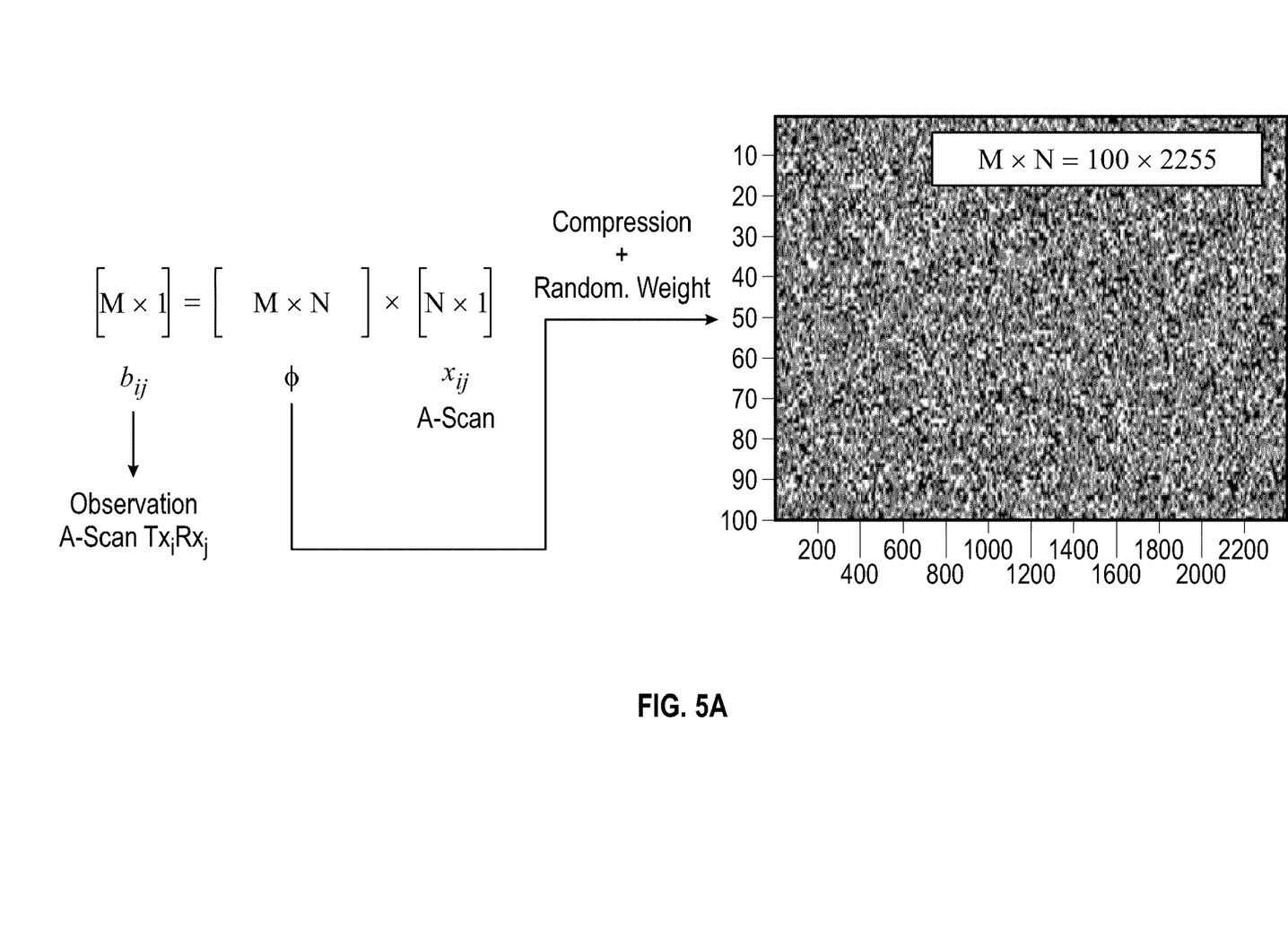
FIGS. 5A-5C show an example of compressive and decoding, according to an example of the subject matter.
Figure 5B:
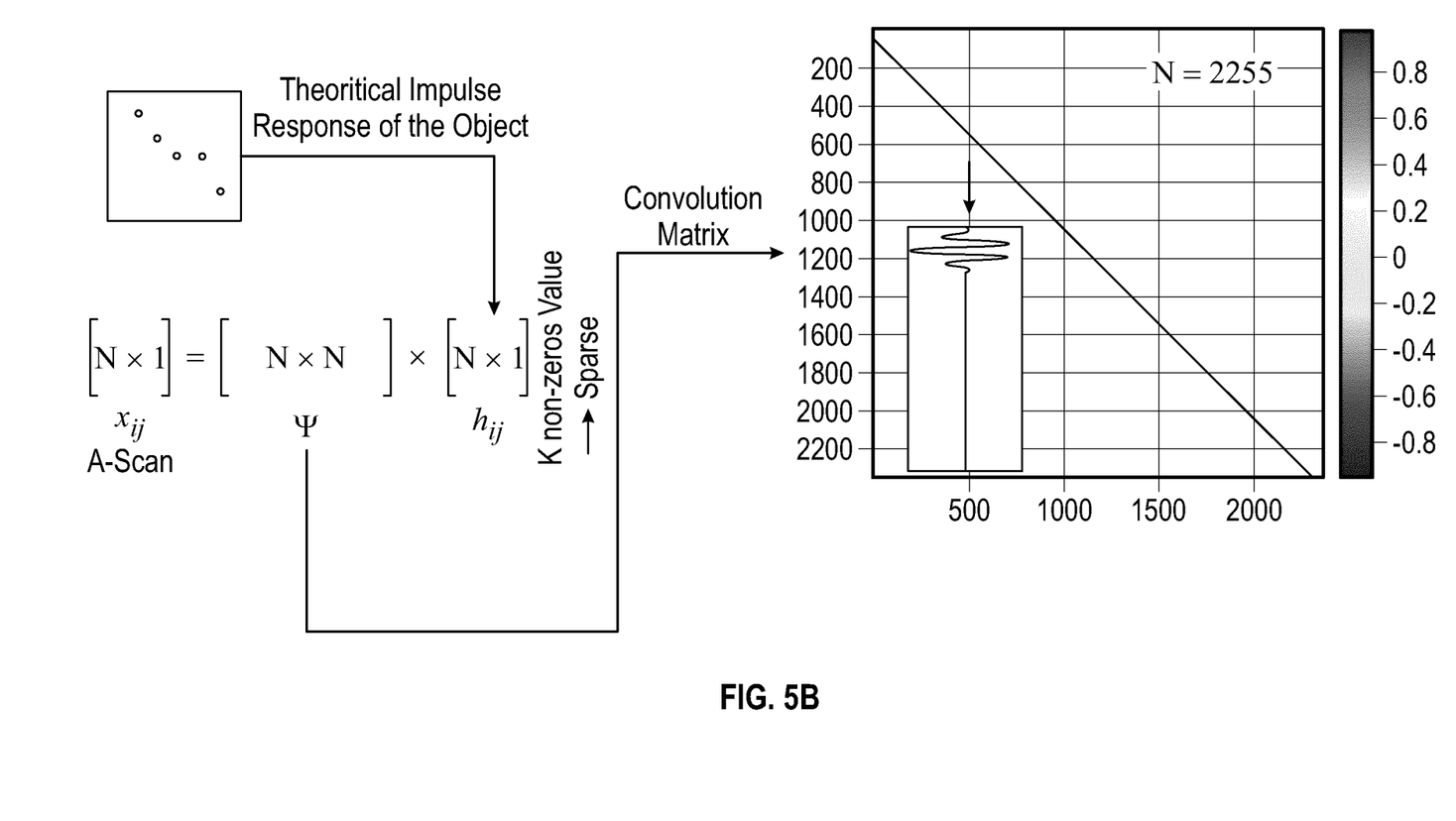
Figure 5C:
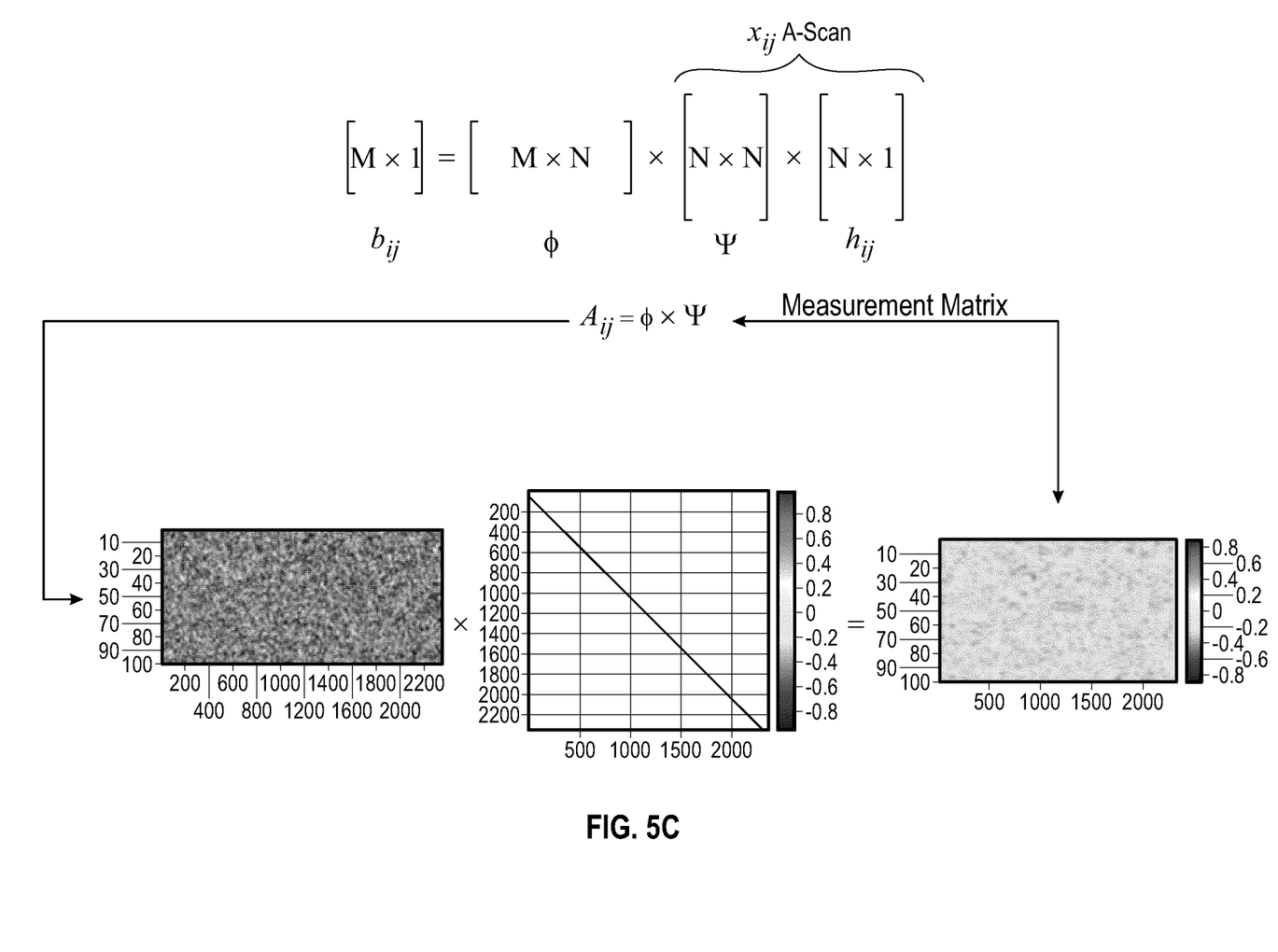

FIG. 4 is mathematical representation of compressive sampling and decoding, according to an example of the subject matter. Here, compressive sampling and decoding is shown as three mathematical steps: 1) data acquisition, 2) model (a priori), and 3) signal estimation. FIGS. 5A-5C show an example of compressive and decoding, according to an example of the subject matter.

In step 402, the data may be acquired at a rate less than the capability of the full matrix, e.g., compressive sampling. The compressive sampled data is represented by b, a M×1 matrix where M is the count of retained samples. $\phi$ may represent randomized weights, shown here as a M×N matrix. The count of available time samples (N) is greater than the count of retained samples (M), i.e., N>M. The goal of this equation is to solve for a x vector, the real-life signal (e.g., A-scan), which would represent data captured by the full matrix. The x vector may be represented by a N×1 matrix. FIG. 5A shows a graphical representation of the data acquisition step.

In step 404, a model (a priori) may be determined. Consider a non-destructive inspection application as described above. The real-life signal x (scans) may be the result of the combination (by convolution) of a few defects of the object to be inspected and the IR of the probe. Thus, a model for the real-life signal x may be represented by a set of non-zero coefficients h convolved by a $\psi$ matrix, which may integrate the different possible temporal positions of the probe IR. For example, $\psi$ may represent an inverse sparse matrix, and h may represent the IR of the object as sparse coefficients. The values for the inverse sparse matrix and sparse coefficients may be based on characteristics of the matrix of sensing elements and/or the object under testing. $\psi$ may be a model matrix or a convolution matrix; it may function as a dictionary representing the real-life signal x from vector h, which is comprised of sparse coefficients, e.g., N number of non-zero entries. Hence, the real-life signal x may be represented by a set of coefficients. This model may have a specific structure and may be optimized for the problem to be solved. The model may be built from an experimental estimation of the probe impulse response.

For example, if the object to be inspected includes two defects, the vector h may include two non-zero coefficients representing the two defects. The real-life signal x may then be determined by the convolution of h with $\psi$.

Additionally or alternatively, the model may be based on a mathematical model or equation, which describes behavior of the probe. For example, an inverse DCT matrix may be used. Coefficients h may represent frequency components of the real-life signal x. Physical signals are sparse in the frequency domain (i.e., include a few non-zero coefficients to describe real-life signal x with sufficient accuracy). The model may be randomized, and information may be inputted for what is expected. The model may be a deterministic model. FIG. 5B shows a graphical representation of the model calculation step.

In step 406, a signal may be estimated based on the acquired data and the model (b=A·h). Here, the measurement matrix, A, may be represented by:

$$A = \phi \cdot \psi$$

$\phi$ may be a matrix and may contain (much) fewer rows (M) than columns (N), i.e., N>M, which allows compression of the signal as described herein. $\psi$ matrix may provide information on the model of the signal, as described above, that is to be reconstructed.

The observation matrix, b, may then be characterized as the product of the measurement matrix A and the sparse coefficients h (b=A·h). Therefore, the x vector may be characterized as:

$$x = \psi \cdot h$$

Hence, signal estimation of the sparse coefficients h may be performed using the inversion of the measurement matrix A. Then, the real-life signal x may be recovered based on the estimation of the sparse coefficients h and the $\psi$ matrix (e.g., the model). FIG. 5C shows a graphical representation of the signal estimation step.

Figure 6:
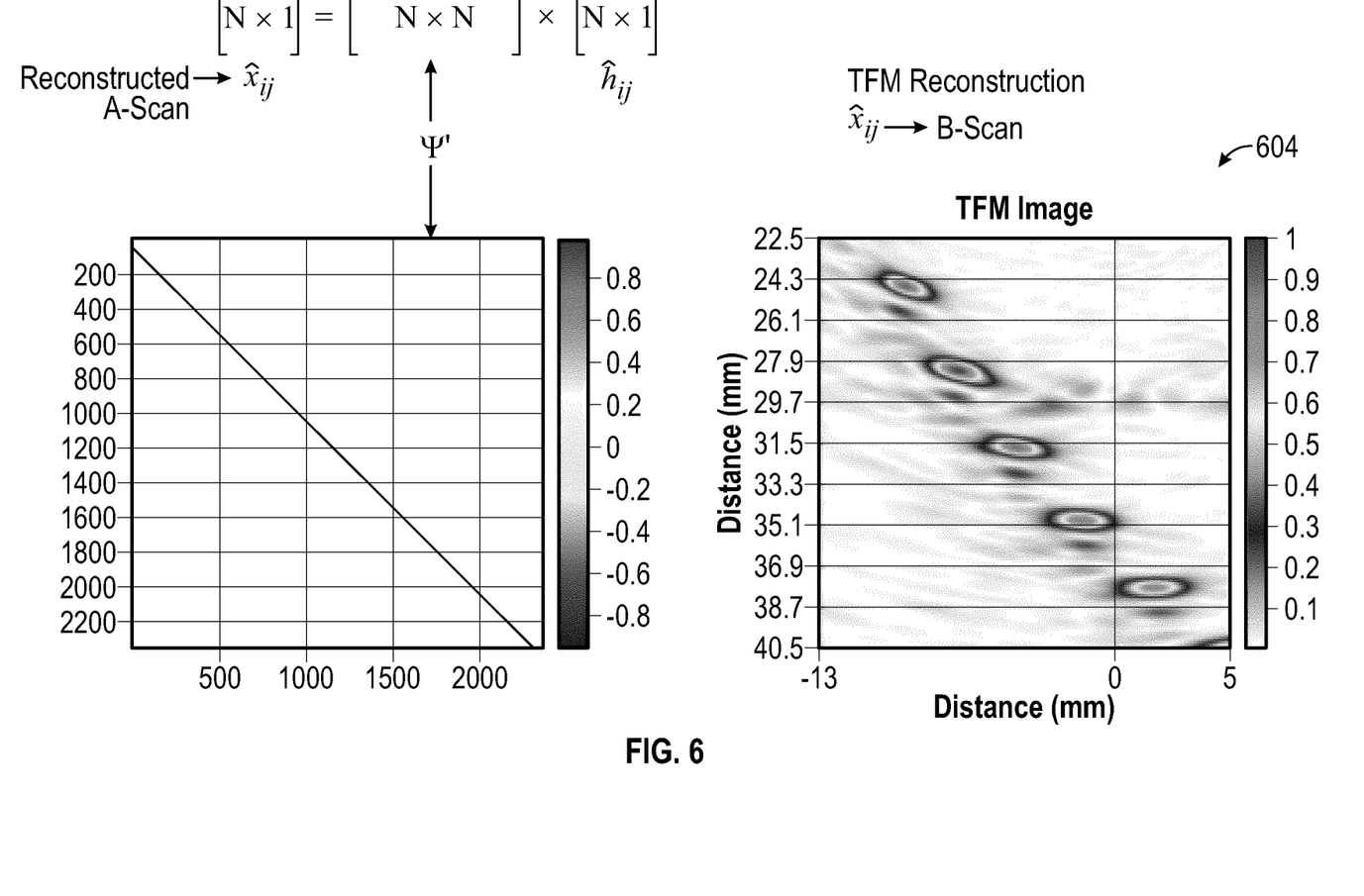
FIG. 6 illustrates TFM reconstruction using compressed sampled data, according to an example of the subject matter.

FIG. 6 illustrates TFM reconstruction using compressed sampled data, according to an example of the subject matter. At 602, A-scan data representing the full matrix may be reconstructed, as described above. Here, $\psi'$ may be used instead of $\psi$. However, $\psi'$ may be represented by $\psi$, or may be different to adjust the resolution of the TFM image. For example, the bandwidth of the signals that compose $\psi'$ matrix may be turned to adjust the resolution of the TFM image. At 604, TFM image may be generated based on the reconstructed data using known TFM techniques.

Figure 7:
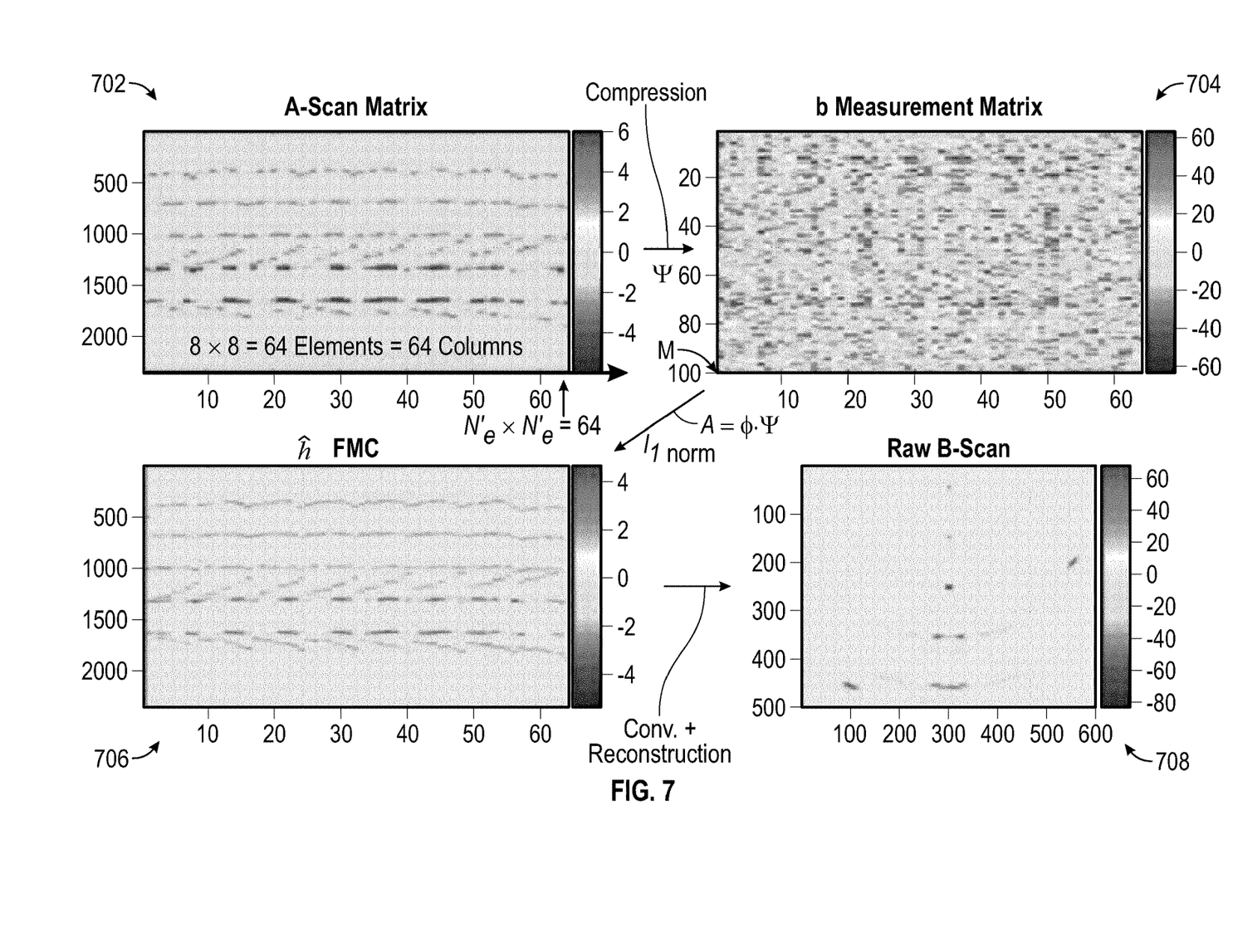
FIG. 7 show the results of a TFM reconstruction with compressive sampling, according to an example of the subject matter.

FIG. 7 show the results of a TFM reconstruction with compressive sampling, according to an example of the subject matter. At 702, the acquired data in the form of an A-scan matrix is shown. Here, the sensing elements are provided as a 8×8 matrix for illustration purposes, and other configurations may also be used (e.g., 32×32). At 704, the data is compressively sampled to generate the b measurement matrix, i.e., not all available samples are generated or retained. The under sampling may be randomly performed. At 706, a model of the FMC may be determined. And at 708, the full image may then be reconstructed using the techniques described herein and a TFM image may be generated.

Figure 8:
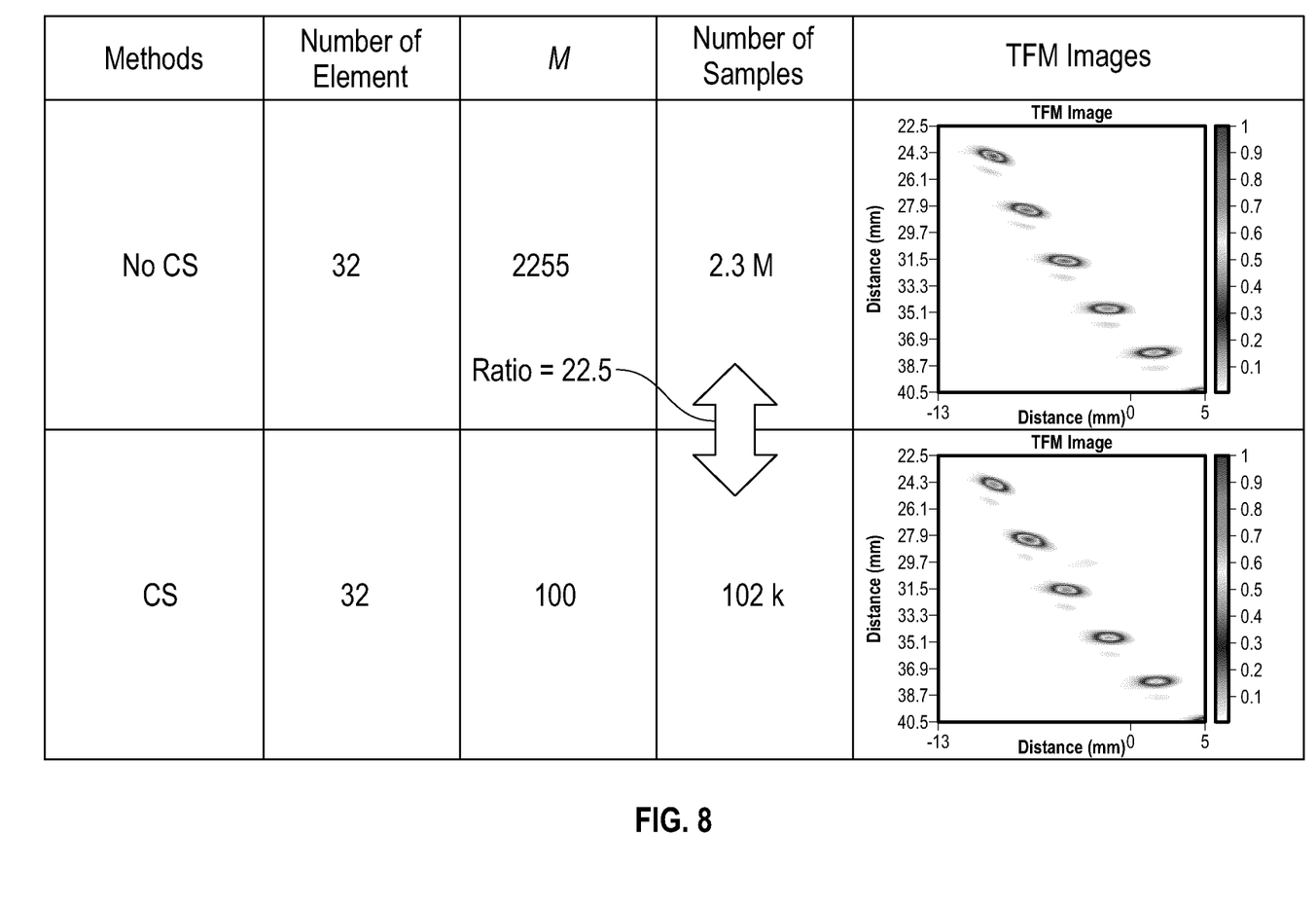
FIG. 8 shows a comparison of TFM images, according to an example of the subject matter.

FIG. 8 shows a comparison of TFM image generated using compressive sampling and one generated without use compressing sampling (e.g., full matrix sampling), according to an example of the subject matter. The settings for both images are the same, such as using the same input signals, carrier frequency=5 MHz, SNR=20 dB, and sampling frequency=100 MHz. Data for both images was acquired using the same the number of elements (e.g., 32 elements).

As shown, the TFM image generated using compressive sampling performs comparable to the TFM image generated using full matrix sampling, particularly with respect to defect detection. But the TFM image generated using compressive sampling in this example used a total of 102,000 samples as compared to 2.3 million samples. Thus, compressive sampling as described herein can reduce the data quantity to be transmitted (e.g., by a ratio=22.5) without sacrificing image quality.

Figure 9:
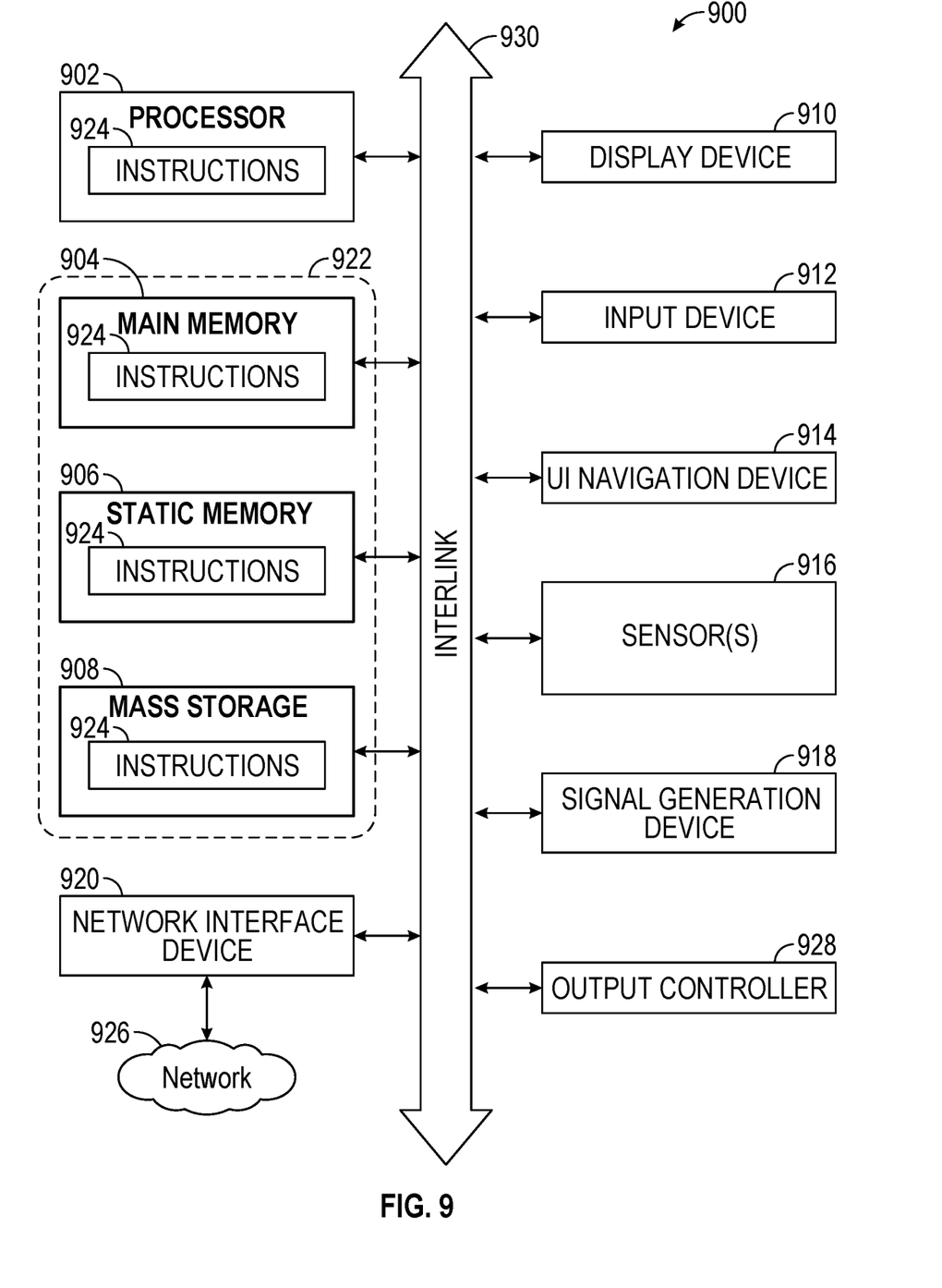
FIG. 9 illustrates a block diagram of an example comprising a machine upon which any one or more of the techniques (e.g., methodologies) discussed herein may be performed.

The techniques shown and described in this document can be performed using a portion or an entirety of an inspection system 100 as shown in FIG. 1 or otherwise using a machine 900 as discussed below in relation to FIG. 9. FIG. 9 illustrates a block diagram of an example comprising a machine 900 upon which any one or more of the techniques (e.g., methodologies) discussed herein may be performed. In various examples, the machine 900 may operate as a stand-alone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 920, an alphanumeric input device 922 (e.g., a keyboard), and a user interface (UI) navigation device 924 (e.g., a mouse). In an example, the display unit 920, input device 922 and UI navigation device 924 may be a touch screen display. The machine 900 may additionally include a storage device (e.g., drive unit) 926, a signal generation device 928 (e.g., a speaker), a network interface device 920, and one or more sensors 922, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 926 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 909, or the storage device 926 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

VARIOUS NOTES

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:
   obtaining signals representative of one or more acoustic waves received using an acoustic probe with a matrix of sensing elements in response to one or more acoustic signals being transmitted into an object under test using the acoustic probe, wherein N samples define a full matrix representation of the signals;
   under sampling the obtained signals by a subset M samples, wherein N is greater than M;
   transmitting the M samples to a post-acquisition application; and
   reconstructing, by the post-acquisition application, an image from the M samples, wherein reconstructing the image comprises:
   establishing a model of a full-matrix representation;
   based on the model, converting the M samples to a reconstructed full-matrix representation of the signals; and
   generating a reconstructed image based on the reconstructed full-matrix representation, wherein the model includes an inverse sparse matrix, and coefficients of the inverse sparse matrix are based on characteristics of the object under test.

2. The method of claim 1, further comprising:
   applying weights to the M samples.

3. The method of claim 1, wherein the M samples are randomly selected.

4. The method of claim 1, wherein coefficients of the inverse sparse matrix are based on characteristics of the matrix of sensing elements.

5. A non-transitory machine-storage medium embodying instructions that, when executed by a machine, cause the machine to perform operations comprising:
   obtaining signals representative of one or more acoustic waves received using an acoustic probe with a matrix of sensing elements in response to one or more acoustic signals being transmitted into an object under test using the acoustic probe, wherein N samples define a full matrix representation of the signals;

under sampling the obtained signals by a subset M samples, wherein N is greater than M;

transmitting the M samples to a post-acquisition application; and reconstructing, by the post-acquisition application, an image from the M samples, wherein reconstructing the image comprises:

establishing a model of a full-matrix representation;

based on the model, converting the M samples to a reconstructed full-matrix representation of the signals; and generating a reconstructed image based on the reconstructed full-matrix representation, wherein the model includes an inverse sparse matrix, and coefficients of the inverse sparse matrix are based on characteristics of the object under test.

6. The non-transitory machine-storage medium of claim 5, further comprising:
applying weights to the M samples.

7. The non-transitory machine-storage medium of claim 5, wherein the M samples are randomly selected.

8. The non-transitory machine-storage medium of claim 5, wherein coefficients of the inverse sparse matrix are based on characteristics of the matrix of sensing elements.

9. A system comprising:
one or more processors of a machine; and
a memory storing instructions that, when executed by the one or more processors, cause the machine to perform operations comprising:

obtaining signals representative of one or more acoustic waves received using an acoustic probe with a matrix of sensing elements in response to one or more acoustic signals being transmitted into an object under test using the acoustic probe, wherein N samples define a full matrix representation of the signals;

under sampling the obtained signals by a subset M samples, wherein N is greater than M;

transmitting the M samples to a post-acquisition application; and reconstructing, by the post-acquisition application, an image from the M samples, wherein reconstructing the image comprises:

establishing a model of a full-matrix representation;

based on the model, converting the M samples to a reconstructed full-matrix representation of the signals; and generating a reconstructed image based on the reconstructed full-matrix representation, wherein the model includes an inverse sparse matrix, and coefficients of the inverse sparse matrix are based on characteristics of the object under test.

10. The system of claim 9, the operations further comprising:
applying weights to the M samples.

11. The system of claim 9, wherein the M samples are randomly selected.

12. The system of claim 9, wherein coefficients of the inverse sparse matrix are based on characteristics of the matrix of sensing elements.

* * * * *